United States Patent [19]

Katoh et al.

[11] Patent Number: 4,849,239

[45] Date of Patent: Jul. 18, 1989

[54] PREMIX

[75] Inventors: You Katoh, Ushiku; Takehiko Ogino, Ishioka; Naoko Totsuka, Miho, all of Japan

[73] Assignee: Kyowa Hakko Kogyo Co., Ltd., Tokyo, Japan

[21] Appl. No.: 70,045

[22] Filed: Jul. 6, 1987

Related U.S. Application Data

[62] Division of Ser. No. 820,740, Jan. 22, 1986, abandoned.

[30] Foreign Application Priority Data

Jan. 23, 1985 [JP] Japan .................................. 60-10654

[51] Int. Cl.$^4$ ............................................. A21D 13/00
[52] U.S. Cl. .................................. 426/549; 426/550; 426/653; 426/662
[58] Field of Search ............... 426/662, 653, 559, 549, 426/550

[56] References Cited

U.S. PATENT DOCUMENTS

| | | | |
|---|---|---|---|
| 3,880,824 | 4/1975 | Rao | 426/656 |
| 3,925,343 | 12/1975 | Hampton | 426/653 |
| 3,966,990 | 6/1976 | Cremer | 426/549 |
| 4,159,348 | 6/1979 | Dogliotti | 426/549 |
| 4,198,438 | 4/1980 | Singer | 426/656 |
| 4,200,569 | 4/1980 | Ladbrooke | 426/549 |
| 4,305,971 | 12/1981 | Stone | 426/549 |
| 4,396,637 | 8/1983 | Singer | 426/549 |

FOREIGN PATENT DOCUMENTS 0134658 9/1984 European Pat. Off. .

*Primary Examiner*—Donald E. Czaja
*Assistant Examiner*—Carolyn Paden
*Attorney, Agent, or Firm*—Antonelli, Terry & Wands

[57] ABSTRACT

A premix containing starch and a specified vital gluten, i.e. PL gluten, is described as being useful for preparing confectioneries.

4 Claims, No Drawings

PREMIX

This is a divisional of application Ser. No. 820,740, filed Jan. 22, 1986.

BACKGROUND OF THE INVENTION

The present invention relates to a premix containing starch and a specified vital gluten.

In general, bakery products such as sponge cakes, steam bread, cake doughnuts and cookies are made using flour as one of the main raw materials. The suitable kind of flour is the cake flour which has a low content of gluten and which has a low viscoelasticity when made into dough.

According to the kinds of the objective bakery products, ingredients such as sugar, table salt, fat and oil, and eggs are usually added to the flour to produce these products.

SUMMARY OF THE INVENTION

The present invention provides a premix containing (A) starch and (B) a specified vital gluten (hereinafter referred to as PL gluten) wherein the bound monoacyl glycerophospholipid content in the bound phospholipids is 30 mol% or more and in cases when the bound monoacyl glycerophospholipid content is 50 mol% or less, the content of the bound phospholipids is 2% or more.

Bakery products of high quality can be obtained by using the premix of the present invention.

DETAILED DESCRIPTION OF THE INVENTION

The PL gluten employed in the present invention is a vital gluten wherein the bound monoacyl glycerophospholipid content in the bound phospholipids 30 mol% or more and when the bound monoacyl glycerophospholipid content is 50 mol% or less, the content of bound phospholipids is 2% or more. The vital gluten of the invention is characterized in that phospholipids are bound to gluten proteins and the content of monoacyl glycerophospholipids in the bound lipids is higher than ordinary commercially available vital gluten.

A detailed description of the PL gluten employed in this invention is given in European Patent Publication No. 0134658/85 published on Mar. 20, 1985 and in AU-A-30445/84 published on Jan. 17, 1985.

A method for preparing the PL gluten is briefly described hereinafter.

The PL gluten is obtained by adding phospholipase A (hereinafter referred to as PL-A) to flour in the ratio of $10^2$–$10^4$ units per 1 kg of flour, further adding water thereto and kneading the mixture by a conventional method and washing the kneaded mixture with water to remove starch and the like. The PL gluten can also be obtained by treating the mixture prepared by adding phospholipid to the flour and PL-A in the same way as given above, or by converting phospholipid to the phospholipid having a high content of monoacyl glycerophospholipid with PL-A and binding the resultant phospholipid to gluten protein in the PL gluten-producing process.

Phospholipid is added in an amount of 0.1–10% based on that of flour.

As the starch to be utilized for preparing the premix, wheat starch, rice starch, corn starch, potato starch, waxy corn starch, arrowroot starch, etc. can be used.

The amount of the PL gluten contained in the premix is in the range of 0.5–20 parts based on 100 parts of starch.

In addition to bread flour (hard flour), noodle flour (semi-hard flour) and commercially available vital gluten, the premix can include, if necessary, ingredients usually used in the production of bakery products such as sugar, table salt, fat and oil, skim milk, emulsifiers, flavors, etc.

By use of the premix, bakery products (sponge cake, steam bred, cake doughnuts, cookies, etc.) of good quality can be produced.

The present invention is illustrated by the following Examples wherein all numerical values refer to parts by weight unless otherwise indicated.

Example 1

Sponge Cake

| Test Group No. | I | II | III | IV | V |
| --- | --- | --- | --- | --- | --- |
| Cake flour | 100 | — | — | — | — |
| Wheat starch | — | 92 | 92 | — | — |
| Rice starch | — | — | — | 92 | 92 |
| PL gluten (obtained in Reference Example 1, the same shall apply hereinafter) | — | 8 | — | 8 | — |
| Commercially available gluten | — | — | 8 | — | 8 |
| Sugar | 100 | 100 | 100 | 100 | 100 |
| Whole egg | 100 | 100 | 100 | 100 | 100 |
| Baking powder | 2 | 2 | 2 | 2 | 2 |
| Sugar ester | 4 | 4 | 4 | 4 | 4 |
| Table salt | 0.45 | 0.45 | 0.45 | 0.45 | 0.45 |
| Water | 35 | 35 | 35 | 35 | 35 |

Production Process (1) Cake flour, wheat starch, rice starch, PL gluten, commercially available gluten, and baking powder were mixed an sifted [mixture (1)].

(2) Whole eggs, water, sugar ester, sugar and table salt were placed into a mixer and mixed well with a whipper to cause air bubbles.

(3) The mixture (1) was gradually put into the mixer and sufficiently stirred to obtain a whipped batter.

(4) The resulting whipped batter was put into a cake pan and baked at 200° C. The result is shown in Table 1.

TABLE 1

| Test Group | Main Raw Materials | Batter Specific Gravity | Specific Volume*1 | Rate of Well-balanced Shape*2 | Grain*3 | Texture*3 |
| --- | --- | --- | --- | --- | --- | --- |
| I | Cake flour, | 0.43 | 4.68 | 0.71 | + | + |
| II | Wheat starch PL gluten | 0.43 | 5.90 | 0.85 | ++ | ++ |
| III | Wheat starch Commercially available | 0.43 | 4.58 | 1.13 | — | — |

TABLE 1-continued

| Test Group | Main Raw Materials | Batter Specific Gravity | Specific Volume*1 | Rate of Well-balanced Shape*2 | Grain*3 | Texture*3 |
|---|---|---|---|---|---|---|
| IV | gluten Rice starch PL gluten | 0.43 | 4.97 | 0.83 | + | + |
| V | Rice starch Commercially available gluten | 0.43 | 4.02 | 1.02 | − | − |

*1: The specific volume was measured by the rapeseed-substituting method.

*2: The rate of well-balanced shape was calculated by cutting a cake along its diameter and measuring the height as shown in the following drawing. When the value was close to 1, the upper surface was almost horizontal. As the value decreased, the center of the upper surface was raised.

When the value was over 1, the center of the upper surface was concave.

 Rate of well-balanced shape = $\frac{b}{a}$

*3: The evaluation as to grain and texture was carried out by sensory evaluation and is expressed as follows: −: poor, +: good, ++: very good.

As is apparent from Table 1, the test groups II and IV were superior not only to the test groups III and V but also to the test group I since the volume of the cake was larger, the appearance of the upper surface was nearly flat an so suitable for the secondary processing such as decoration, and the grain and texture were better.

Example 2

Butter Sponge Cake

| Composition: Test Group No. | I | II | III |
|---|---|---|---|
| Cake flour | 100 | — | — |
| Corn starch | — | 92 | 92 |
| PL gluten | — | 8 | — |
| Commercially available gluten | — | — | 8 |
| Sugar | 100 | 100 | 100 |
| Whole egg | 140 | 140 | 140 |
| Table salt | 0.7 | 0.7 | 0.7 |
| Baking powder | 1 | 1 | 1 |
| High fructose corn syrup | 20 | 20 | 20 |
| Whipping agent containing fat | 15 | 15 | 15 |
| Rum | 4 | 4 | 4 |
| Vanilla oil | 0.4 | 0.4 | 0.4 |
| Water | 20 | 20 | 20 |

Production Process (1) Sugar, whole eggs, table salt, high fructose corn syrup, whipping agent containing fat, run, vanilla oil and water were mixed at a low speed for 30 sec. (Mixing was carried out with a vertical type mixer equipped with a whipper).

(2) Cake flour, corn starch, PL gluten or commercially available gluten and baking powder which were previously sifted were mixed with the mixture obtained in (1). (mixing was carried out at a low speed for 2 min. and at a moderate speed for 1 min.)

(3) The thus obtained batter was mixed by using a continuous mixer.

| Pump | |
|---|---|
| Rotary speed | 70 rpm |
| Rotary speed | 200 rpm |
| Rotary pressure | 3 kg/cm$^2$ |
| Batter specific gravity | about 0.53 |
| Batter temperature | 23° C. |

(4) The batter made in the above (3) was placed into a cake pan and baked in an oven (about 180° C.).

The results are shown in Table 2.

TABLE 2

| Test group | Main Raw Materials | Specific Volume | Grain* | Texture* |
|---|---|---|---|---|
| I | Cake flour | 3.64 | + | + |
| II | Corn starch PL gluten | 3.62 | + | + |
| III | Corn starch Commercially available gluten | 3.02 | − | − |

*+: good,
−: poor

As is apparent from Table 2, the product in the test group II was superior to that in the test group III and was of the same quality as the conventional one.

Example 3

Steam Bread

| Composition: Test Group No. | I | II | III |
|---|---|---|---|
| Cake flour | 100 | — | — |
| Wheat starch | — | 92 | 92 |
| PL gluten | — | 8 | — |
| Commercially available gluten | — | — | 8 |
| Sugar | 25 | 25 | 25 |
| Table salt | 0.3 | 0.3 | 0.3 |
| Baking powder | 4 | 4 | 4 |
| Whole egg | 10 | 10 | 10 |
| Water | 60 | 50 | 50 |

Production Process (1) Whole eggs and water were poured into a mixer and sufficiently mixed.

(2) The other raw materials were sifted and mixed, followed by mixing with the above mixture (1). (Vertical type mixer equipped with a beater was used at a low speed for 30 sec. and at a moderate speed for 30 sec.)

(3) The above batter was put into a cake pan and steamed. (Steam pressure: 0.5 kg/cm$^2$, Steaming time: about 20 min.)

The results are shown in Table 3.

TABLE 3

| Test group | Main Raw Materials | Specific Volume | Grain* | Color* | Texture* |
|---|---|---|---|---|---|
| I | Cake flour | 2.20 | + | + | + |
| II | Wheat starch PL gluten | 2.22 | + | — | + |
| III | Wheat starch Commercially available gluten | 1.83 | — | — | — |

*+: good,
—: poor

The volume of steam bread in the test group II was substantially the same as in the test group I, and the grain and texture thereof were also good.

Example 4

Cookies

| Composition: Test Group No. | I | II | III | IV | V |
|---|---|---|---|---|---|
| Cake flour | 100 | — | — | — | — |
| Wheat starch | — | 92 | 92 | — | — |
| Potato starch | — | — | — | 92 | 92 |
| PL gluten | — | 8 | — | 8 | — |
| Commercially available gluten | — | — | 8 | — | 8 |
| Sugar | 65 | 65 | 65 | 65 | 65 |
| Whole egg | 15 | 15 | 15 | 15 | 15 |
| Shortening | 45 | 45 | 45 | 45 | 45 |
| Table salt | 1 | 1 | 1 | 1 | 1 |
| Dry milk | 3 | 3 | 3 | 3 | 3 |
| Sodium bicarbonate | 0.5 | 0.5 | 0.5 | 0.5 | 0.5 |
| Ammonium carbonate | 0.5 | 0.5 | 0.5 | 0.5 | 0.5 |
| Baking powder | 0.5 | 0.5 | 0.5 | 0.5 | 0.5 |
| Vanilla | a bit | a bit | a bit | a bit | a bit |

Production Process (1) Flour or starch, gluten, baking powder, sodium bicarbonate, ammonium carbonate, dry milk, table salt, and vanilla were sifted and sufficiently mixed.

(2) Sugar was sifted.

(3) Shortening was put into a mixer and sufficiently mixed by using a beater at a low speed for 30 sec.

(4) The sugar (2) was introduced into the mixer (3) in several installments and mixed well.

(5) Whole eggs were beaten and introduced into (4) in several installments and mixed well.

(6) The mixture (1) was added to (5) in several installments and mixed well to obtain a homogeneous mixture as a whole.

(7) The dough was refrigerated for solidification, formed in a cylinder shape and cut with a wire-cutter. Then, pieces of dough were placed on a baking sheet, and baked at about 190° C.

The result is shown in Table 4.

TABLE 4

| Test group | Main Raw Materials | Appearance* | Softness* | Texture* |
|---|---|---|---|---|
| I | Cake flour | ± | ± | ± |
| II | Wheat starch PL gluten | ± | + | + |
| III | Wheat starch Commercially available gluten | — | — | — |
| IV | Potato starch PL gluten | + | + | + |
| V | Potato starch Commercially available gluten | — | — | — |

*+: good,
±: ordinary,
—: poor

Example 5

Cake Doughnut

| Mix Composition: Test Group No. | I | II | III |
|---|---|---|---|
| Cake flour | 68 | — | — |
| Corn starch | — | 62.5 | 62.5 |
| PL gluten | — | 5.5 | — |
| Commercially available gluten | — | — | 5.5 |
| Sugar | 20 | 20 | 20 |
| Table salt | 1 | 1 | 1 |
| Shortening | 5 | 5 | 5 |
| Skim milk | 4 | 4 | 4 |
| Baking powder | 1.5 | 1.5 | 1.5 |
| Sodium bicarbonate | 0.5 | 0.5 | 0.5 |
| Total | 100 | 100 | 100 |

| Dough Composition: | Amount | Baker's % |
|---|---|---|
| The above mix | 1500 g | 100 |
| Whole egg | 150 | 10 |
| Water | 525 | 35 |

Production Process (1) The powders of the above mix were mixed well, and the shortening was added thereto. The mixture was uniformly blended.

(2) The mix was sufficiently mixed with whole eggs and water in a mixer at a low speed for 40 sec. and at a moderate speed for 20 sec.

(3) Mixing temperature: 20°-24° C., floor time: 10 min.

(4) The dough was deposited with a pressure depositor and fried. (Frying temperature: 180°-185° C., frying time: about 2 min.).

The results are shown in Table 5.

TABLE 5

| Test group | Main Raw Materials | Volume* | Balance* of shape | Oil-** absorption | Texture* |
|---|---|---|---|---|---|
| I | Cake flour | + | + | ± | + |
| II | Corn starch PL gluten | + | + | — | + |
| III | Corn starch Commercially available gluten | — | — | — — | — |

*+: good,
±: ordinary
—: poor
*±: ordinary,
—: a little high,
— —: high

As is apparent from Table 5, when corn starch and PL gluten were used instead of cake flour, the degree of oil-absorption was a little higher but almost the same cake doughnut as in the test group I was obtained. The texture of the test group II was better than that of the test group I using cake flour as the base of the composition.

What is claimed is:

1. A process for producing a bakery product which comprises the steps of preparing an admixture consisting essentially of a starch selected from the group consisting of corn starch and potato starch, a specified vital gluten wherein the bound monoacyl glycerolphospholipid content in the bound phospholipid is 30 mol% or more and in the case when the bound monoacyl glycerolphospholipid content is 50 mol% or less, the content of bound phospholipids is 2% or more, and water; kneading the resulting admixture to provide a dough; and then forming the dough into a bakery product.

2. A process according to claim 1, wherein the bakery product is sponge cake, steam bread, cake doughnut or cookie.

3. A process according to claim 1, wherein the amount of the specified vital gluten is in the range of from 0.5 to 25 parts by weight based on 100 parts by weight of the starch.

4. A process according to claim 1, wherein the amount of the specified vital gluten is in the range of from 0.5 to 25 parts by weight based on 100 parts by weight of the starch.

* * * * *